United States Patent [19]

Hanada et al.

[11] Patent Number: 5,221,455
[45] Date of Patent: Jun. 22, 1993

[54] BIPOLAR MEMBRANE AND METHOD FOR ITS PRODUCTION

[75] Inventors: Fumio Hanada; Koki Hirayama; Nobuhiko Ohmura; Shinsuke Tanaka, all of Tokuyama, Japan

[73] Assignee: Tokuyama Soda Kabushiki Kaisha, Tokuyama, Japan

[21] Appl. No.: 708,497

[22] Filed: May 31, 1991

[30] Foreign Application Priority Data

May 31, 1990 [JP] Japan .................................. 2-139870

[51] Int. Cl.$^5$ ............................................. C25B 13/08
[52] U.S. Cl. ........................................ 204/296; 521/27
[58] Field of Search ................... 204/295, 296; 521/27

[56] References Cited

U.S. PATENT DOCUMENTS 4,116,889  9/1978  Chlanda et al. .................. 204/182.4

FOREIGN PATENT DOCUMENTS 2122543A  1/1984  United Kingdom .

OTHER PUBLICATIONS

Friedrich Helfferich, "Ion Exchange", McGraw-Hill Book Co., Inc., New York (1962), pp. 12-15.

Primary Examiner—John Niebling
Assistant Examiner—Kathryn Gorgos
Attorney, Agent, or Firm—Sherman and Shalloway

[57] ABSTRACT

Disclosed is a bipolar membrane comprising a cation-exchange membrane in which a cation-exchange group present at least at its adhered surface has been ion-exchanged with a heavy metal ion, which is adhered closely to an anion-exchange membrane at a peel strength of not less than 0.2 kg f/25 mm, and having a water-splitting current efficiency of not less than 80% and a water-splitting membrane potential of not more than 2.0 V.

18 Claims, 1 Drawing Sheet

BIPOLAR MEMBRANE AND METHOD FOR ITS PRODUCTION

BACKGROUND OF THE INVENTION

1. Field of the Invention

The present invention relates to a novel bipolar membrane and a method for producing it. More particularly, the present invention provides a bipolar membrane comprising a cation-exchange membrane in which a cation-exchange group present at least at its adhered surface has been ion-exchanged with a heavy metal ion, which is adhered closely to an anion-exchange membrane at a peel strength of not less than 0.2 kg·f/25 mm, and having a water-splitting current efficiency of not less than 80% and a water-splitting membrane potential of not more than 2.0 V.

2. Description of the Prior Art

Bipolar membranes are widely used as diaphragms in the electrolysis of water (water splitting) or as separating membranes used in reclaiming acids and alkalis from aqueous solutions of salts that are products formed by neutralization between acids and alkalis, and ion-exchange membranes known in the art. They have a basic structure comprised of a lamination of a cation-exchange membrane and an anion-exchange membrane, and various methods for their production have been proposed.

The methods can be exemplified by a method in which a cation-exchange membrane and an anion-exchange membrane are laminated using a mixture of polyethyleneimine and epichlorohydrin and then bonded to each other by curing (Japanese Patent Publication No. 32-3962); a method in which a cation-exchange membrane is bonded to an anion-exchange membrane by using an adhesive having the properties of exchanging ions (Japanese Patent Publication No. 34-3961); a method in which a pasty material comprising vinyl pyridine and an epoxy compound is coated on the surface of a cation-exchange membrane, followed by exposure to radiations to obtain the product (Japanese Patent Publication No. 38-16633); a method in which a sulfonic acid polymeric electrolyte and an allylamine are adhered to the surface of an anion-exchange membrane, followed by exposure to ionizing radiations (Japanese Patent Publication No. 51-4113); (Japanese Laid-Open Patent Application No. 53-37190); and a method in which a polyethylene film is impregnated with styrene and divinylbenzene followed by polymerization to give a sheet-like material, which was then nipped between frames made of stainless steel, where one side thereof is sulfonated, and thereafter, the sheet is detached and the remaining side is chloromethylated followed by treatment for amination (U.S. Pat. No. 3,562,139).

The bipolar membranes obtained by these methods, however, have the problem that a membrane potential much higher (e.g., 2.5 V to 3.0 V, or higher) than the theoretical water-splitting membrane potential (0.83 V) is applied when it is attempted to split off water, resulting in high-power consumption. They also can never have satisfactory current efficiency.

Electrochemica Acta, Vol. 31, No. 9, pp.1175-1176 (1986) reports a production method in which cation- and anion-exchange membranes whose surfaces have been coated with a solution comprising at least one kind of inorganic electrolyte selected from sodium tungstate, chromium nitrate, sodium metasilicate, and ruthenium trichloride are put together and then pressed to give a bipolar membrane having a low water-splitting membrane potential. This bipolar membrane, compared with the above numerous bipolar membranes, is characteristic of a low water-splitting membrane potential, which, however, is only at the initial stage of use. Thus, this membrane is disadvantageous in that the water-splitting membrane potential increases in a relatively short time, bubbles or blisters may occur at the interface between the cation-exchange membrane and anion-exchange membrane which is then of no use, and also, depending on conditions in its use, the bipolar membrane may separate into the cation-exchange membrane and the anion-exchange membrane which is then of no use. It also cannot satisfy current efficiency, and can not be said to be a bipolar membrane that can be of satisfactory use on an industrial scale.

SUMMARY OF THE INVENTION

An object of the present invention is to provide a bipolar membrane that can be used in an industrial scale.

Another object of the present invention is to provide a bipolar membrane that has a water-splitting current efficiency of not less than 80%, and preferably not less than 90%, has a water-splitting membrane potential of not more than 2.0 V, and preferably not more than 1.8 V, and also can be used for a long period of time.

Still another object of the present invention is to provide a bipolar membrane comprised of a cation-exchange membrane on the surface of which a film comprising a polymer having an anion-exchange group is formed, thereby giving a peel strength of not less than 0.2 kg·f/25 mm.

Further objects of the present invention will become apparent from the following detailed description.

As a bipolar membrane having achieved the above various objects, the present invention provides a bipolar membrane comprising a cation-exchange membrane in which a cation-exchange group present at least at its adhered surface has been ion-exchanged with a heavy metal ion;

said cation-exchange membrane and an anion-exchange membrane being adhered closely to each other at a peel strength of not less than 0.2 kg·f/25 mm; and said bipolar membrane having a water-splitting current efficiency of not less than 80%, and a water-splitting membrane potential of not more than 2.0 V.

DESCRIPTION OF THE PREFERRED EMBODIMENTS

Figure 1:
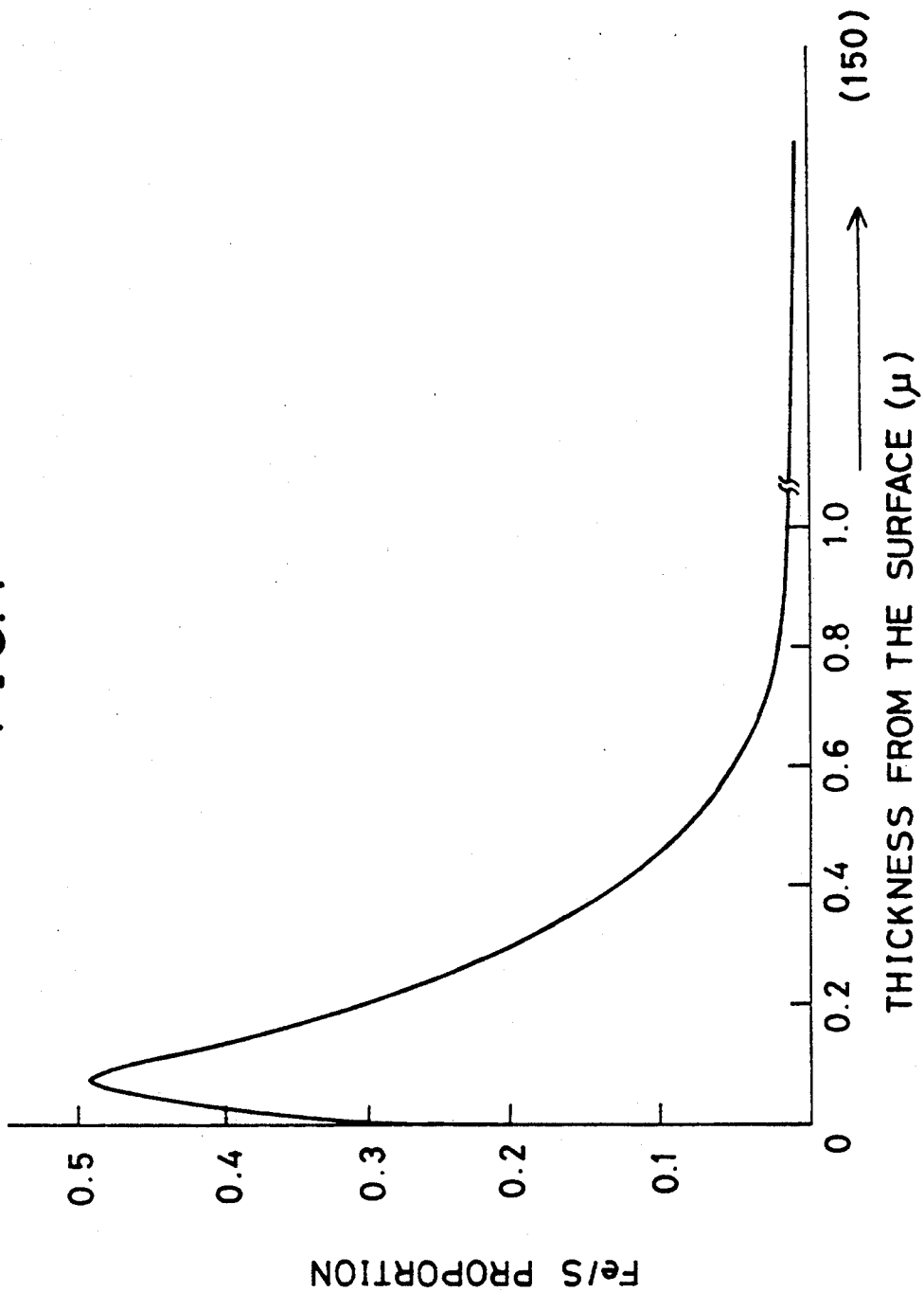
FIG. 1 shows the proportion of Fe atoms and S atoms (Fe/S) measured by ESCA, present in a bipolar membrane according to the present invention.

There are no particular limitations on the cation-exchange membrane that constitutes the bipolar membrane of the present invention. Any conventional cation-exchange membranes can be used. For example, a cation-exchange membrane having an ion-exchange group such as a sulfonic acid group or a carboxylic acid can be used. In particular, taking account of the purpose of bipolar membranes, most preferred is a cation-exchange membrane having a sulfonic acid group retaining an exchange group dissociated even under an acidic condition. There are no particular limitations on the cation-exchange capacity of this cation-exchange membrane, and those conventionally known can be used. In general, it may be in the range of 0.5 meq/g to 3 meq/g, and preferably 1 meq/g to 2.5 meq/g.

The cation-exchange membrane may be of a polymerized type, a homogeneous type or a nonhomogeneous type, may be or need not be provided with a reinforcing material (center layer), and may be of any kinds and forms that may vary depending on the method in which cation-exchange membranes are prepared. Ion-exchange membranes comprising a cation-exchange membrane having therein a small amount of an anion-exchange group may also be satisfactorily used as the cation-exchange membrane of the present invention so long as they have cation transport numbers of not less than 0.9.

In the cation-exchange membrane used in the present invention, a counter ion of an ion-exchange group present at least at its adhered surface (i.e., the surface to which the anion-exchange membrane is adhered) is required to have been ion-exchanged with a heavy metal ion to give a heavy metal type membrane. Such a heavy metal (ion) referred to in the present invention may include elements (ions) of the atomic number of from 20 to 90, preferably from 22 to 50, and more preferably from 26 to 50, except for halogens and inert gas elements. In general, those preferably used may specifically include ions of iron (II, III), titanium (IV), tin (II, IV), zirconium (IV), palladium (II), and ruthenium (III). In particular, ions of iron, ruthenium and tin are effective. The cation-exchange membrane of a heavy metal type can be obtained using conventionally known ion-exchange methods. It can be commonly obtained by, e.g., a method in which a cation-exchange membrane is immersed in a solution of a heavy metal salt, and a method in which a solution of a heavy metal salt is coated or sprayed onto a cation-exchange membrane. The heavy metal ions present in such a heavy metal type cation-exchange membrane need not be distributed uniformly in the thickness direction (i.e., to the whole extent) of the membrane, and may be present at least on the side to which the anion-exchange membrane is put and adhered. The ion-exchanged heavy metal ions may be present usually in such a proportion that they comprise 0.001% to 100%, and particularly preferably 0.01% to 50%, of the total ion-exchange capacity.

In the bipolar membrane of the present invention, the cation-exchange membrane having been ion-exchanged with the above heavy metal ions may be bonded to the anion-exchange membrane by any methods so long as the requirement previously described as specified in the present invention can be met. That is, the cation-exchange membrane and the anion-exchange membrane must be adhered closely to each other at a peel strength of not less than 0.2 kg·f/25 mm in a wet state. A peel strength smaller than the above value is not preferred because it tends to cause separation of both the membranes when the bipolar membrane is used in a wet state as in water splitting, making its long-term use impossible, to cause bubbles or blisters at the interface between the both membranes when used, resulting in a lowering of current efficiency per unit membrane surface area, and to bring about a gradual increase in membrane potential while the bipolar membrane is used for a longer period of time, making it impossible to continue its industrial use.

The bipolar membrane of the present invention is required to have no blisters or bubbles at the interface between the cation-exchange membrane and anion-exchange membrane regardless of conditions of its use. Although the mechanism by which the blisters or bubbles occur is not necessarily clear, the present inventors have confirmed that the causes differ depending on the production method of bipolar membranes. For example, in order to introduce heavy metal ions to the ion-exchange groups present at the adhered surface of the cation-exchange membrane, a method is often employed in which the cation-exchange membrane is immersed in a solution of a heavy metal salt or a solution of a heavy metal salt is coated or sprayed onto the cation-exchange membrane. In such a method, the resulting bipolar membrane may have blisters or bubbles at its interface when immersed in water, if the anion-exchange membrane is bonded in the state that an unreacted heavy metal salt solution remains on the surface of the cation-exchange membrane. Hence, it is a very important factor in the above bipolar membrane that neither unreacted heavy metal salt solution nor water is present at the interface of the cation-exchange membrane and anion-exchange membrane. In the method described above, it is preferred to thoroughly wash and then dry the adhered surface of the cation-exchange membrane having been ion-exchanged with the heavy metal ion, and thereafter bond it to the anion-exchange membrane.

The above blisters or bubbles that may occur at the interface not only cause separation at the interface between the cation-exchange membrane and anion-exchange membrane, but also cause an increase in the membrane potential. Hence, they must be prevented from occurring.

The bipolar membrane of the present invention is also required to have a water-splitting current efficiency of not less than 80%, and preferably not less than 90%, and also have a water-splitting membrane potential of not more than 2.0 V, and preferably not more than 1.8 V. In regards to this current efficiency, a known bipolar membrane also can satisfy the efficiency of 80%. However, those capable of keeping the membrane potential of not more than 2.0 V for a long period of time are almost unknown. In respect to the membrane potential, some conventional bipolar membranes are known to have a membrane potential of about 1.0 V at the initial stage of their use. In almost all of them, however, this membrane potential gradually increases with the lapse of electrodialysis time to exceed 2.0 V in a very short time.

The properties of the above bipolar membranes can not be achieved by controlling only one step in their production process. The properties can be achieved only by correlating the various requirements with each other. For example, a bipolar membrane having peel strength of not less than 1.0 kg·f/25 mm can also be obtained in the case of a laminated bipolar membrane formed by bonding a cation-exchange membrane to an anion-exchange membrane, or a single-film bipolar membrane comprising a single film of which different ion-exchange groups have been imparted to both surfaces. The bipolar membranes obtained by such methods tend to have a high water-splitting membrane potential and a low current efficiency. Hence, in some instances, the bipolar membrane of the present invention cannot be obtained even if these conventional methods are applied as they are. For this reason, as one of methods for obtaining the bipolar membrane of the present invention, it is recommended in the present invention to closely adhere the cation-exchange membrane to the anion- C exchange membrane by the use of a method in which a film comprising a polymer having an anion-exchange group is formed on the surface of the cation-exchange membrane. This method is hereinafter simply referred to as the polymer film method.

There are no particular limitations on the method of producing the bipolar membrane for the purpose of keeping the peel strength of the bipolar membrane of the present invention not less than 0.2 kg·f/25 mm. However, the above polymer film method is the best when the electrolytic performance of resulting bipolar membranes is taken into account. The peel strength may also be affected by the conditions under which the cation-exchange membrane is treated when the cation-exchange membrane is bonded to the anion-exchange membrane. For example, the peel strength is low, and also, the resulting bipolar membrane can have poor water-splitting performance when the polymer film method is applied in the state where any unreacted heavy metal salts during the introduction of heavy metal ions remain on the cation-exchange membrane. On the other hand, when the polymer film method is applied after the surface of the cation-exchange membrane has been washed and then dried, the peel strength becomes 0.3 to 0.5 kg·f/25 mm or higher. This membrane is well suited for practical use. Moreover, as will be detailed later, a bipolar membrane making use of a cation-exchange membrane whose surface has been roughened and on which the polymer film is formed can give a peel strength of 1 kg·f/25 mm or more, which is of satisfactory strength. Thus, this is a most preferred embodiment.

In order to keep the water-splitting membrane potential of not more than 2.0 V, and preferably not more than 1.8 V, it is a very important factor that the cation-exchange groups present at the adhered surface of the cation-exchange membrane to which the anion-exchange membrane is adhered have been ion-exchanged with the heavy metal ions. The heavy metal ions are present as a result of such an ion exchange are presumed to permeate into the cathode side with the lapse of time and disappear, when water is split off by using the bipolar membrane. Upon experiments by the present inventors, however, it is presumed that the heavy metal ions are released in part from the bipolar membrane with the lapse of time but a very small quantity of heavy metal ions are present at the interface, and the remaining heavy metal ions play a role of preventing the membrane potential from increasing. It is still unclear by what mechanism the heavy metal ions remain at the surface and how the heavy metal ions remaining in a very small quantity act in the prevention of the membrane potential increase. It is presumed that, water is split off into $OH^-$ and $H^+$ in the vicinity of the heavy metal ions having been ion-exchanged to the ion-exchange group of the cation-exchange membrane adhered to the anion-exchange membrane, where the heavy metal ions can move with difficulty compared with $H^+$. The $H^+$ preferentially moves to the cathode direction, so that the heavy metal ions present at the surface adhered to the anion-exchange membrane can remain for a long period of time. On the other hand, heavy metal ions present in the cation-exchange membrane at its part distant from the adhered surface are presumed to move little by little in the cathode direction by the influence of continually flowing $H^+$ ions until they leave the cation-flowing exchange membrane. The water in the vicinity of the heavy metal ions, is affected by the heavy metal ion, and the bonds of water come loose, so that the water can be separated into $H^+$ and $OH^-$ with ease by an application of potential. Here, the heavy metal ions are required to be present only at the surface adhered to the anion-exchange membrane, and hence, it is presumed for the heavy metal ions to be in a very small quantity. As will be detailed in the Examples given later, the content of heavy metal ions can be confirmed by fluorescent X-ray measurement, at the interface of a bipolar membrane before use in water splitting. After use in water splitting for 60 days, the heavy metal ions no longer remain in such a quantity that their presence can be confirmed by the fluorescent X-ray measurement. As shown in FIG. 1, their presence can be confirmed for the fist time by electron spectroscopy of chemical analysis (ESCA). It can be understood from FIG. 1 that the heavy metal ions remain in such a state that their density distribution decreases towards the opposite surface of the adhered surface of the cation-exchange membrane to which the anion-exchange membrane is adhered.

Such a phenomenon has been revealed for the first time by the present invention. It can be said to be a surprising phenomenon that the heavy metal ions ion-exchanged to the ion-exchange groups at the interface remain in such a state they are preferentially distributed without release from the bipolar membrane even after use in water splitting. Moreover, it is surprising that the heavy metal ions remaining in the state that they are preferentially distributed show the action by which the membrane potential can be prevented from increasing and the water splitting can be carried out at a low membrane potential over a long period of time. On the basis of such action, the bipolar membrane of the present invention enables water splitting while maintaining the current efficiency at not less than 80%, and usually not less than 90%.

The bipolar membranes of the present invention may be those obtained by any methods so long as the above properties can be attained. A most recommendable method is the method of producing the bipolar membrane by the polymer film method. This polymer film method will now be described below in detail.

The polymer film method is a method comprising coating the surface of the cation-exchange membrane with a solution prepared by dissolving in a solvent a polymer having an anion-exchange group or a functional group capable of readily introducing an anion-exchange group, removing the solvent to form a film comprising an anion exchanger, and optionally, introducing an anion, thereby obtaining a bipolar membrane. Such a polymer having an anion-exchange group or a functional group capable of readily introducing an anion-exchange group may preferably be a thermoplastic resin soluble in a suitable solvent in order to prepare a solution used to form the film. In order to maintain a high water-splitting efficiency and alkali resistance, the film may preferably be formed as a strongly basic polymer whose anion-exchange group is mainly comprised of a quaternary onium group. As for the thickness of such a film, an excessively large thickness results in an increase in the water-splitting membrane potential and an excessively small thickness results in a lowering of the current efficiency. Hence, it is suited for the thickness to be usually 5 um to 300 um, and particularly 10 um to 200 um.

There are no particular limitations on the polymer having an anion-exchange group, preferably usable in the present invention, so long as it is capable of being dissolved in a solvent. Particularly preferred polymers can be exemplified by linear polymers including copolymers of trialkylvinylbenzyl ammonium with a vinyl compound such as styrene, vinyltoluene or acrylonitrile; polymers obtained by chlorimethylation and then quaternization of polymers such as polysulfone, polyetyrene, polyphenylene oxide, polyether ether ketone, an ethylene-styrene copolymer and a propylenestyrene copolymer; and blend polymers of polysulfone with a polyalkylvinylbenzyl ammonium salt. These linear polymers having an anion-exchange group should preferably have an ion-exchange capacity of usually 0.4 meq/g to 2.5 meq/g, and particularly 0.6 meq/g to 1.5 meq/g, because those having a large ion-exchange capacity make the film formed dissolvable in water or swelled, resulting in a lowering of the water-splitting current efficiency in the bipolar membrane, and those having a small ion-exchange capacity tend to bring about an increase in the water-splitting membrane potential because of an increase in electric resistance.

As for the polymer having a functional group capable of readily introducing an anion-exchange group, used in the present invention, those particularly usable can be exemplified by polymers having a chloromethyl group, such as chloromethylated polystyrene, polychloromethylstyrene, chloromethylated polyphenylene oxide, chloromethylated polyether ether ketone, and a copolymer of chloromethylated ethylene or propylene with styrene. These polymers having a chloromethyl group may be used optionally together with an inert polymer that does not react with amino compounds, such as polysulfone, polystyrene or polyacrylonitrile, to form a polymer solution. Using this polymer solution, a film serving as a precursor of the anion-exchange is formed on the surface of the heavy metal type cation-exchange membrane, which is then reacted with, e.g., a trialkylamine, a dialkylamine, N,N,N',N'-tetramethyl-1,6-hexamethylenediamine, N,N-dimethylpropanediamine or N,N-dimethylbutanediamine. Thus, a film comprised of an anion-exchanger into which a quaternary ammonium salt group and a crosslink have been introduced can be formed. It is also possible to form the polymer film by using in combination a polymer having an anion-exchange group or a functional group capable of being changed to an anion-exchange group and a polymer having two or more reactive groups, simultaneously reacting the above functional group with reactive groups, and optionally, introducing an anion-exchanger having a crosslinked structure can be formed. Such a combination of polymers may preferably include, for example, a combination of a polymer having two or more tertiary amino groups with a polymer having two or more epoxy groups, and a combination of a polymer similarly having two or more tertiary amino groups and a polymer having two or more halomethyl groups. As examples of the above polymer having two or more tertiary amino groups, usable are polydialkylvinylbenzylamines, polydialkylaminoethylstyrenes, polydimethyallylamines, N,N,N',N'-tetramethyl-1,6-hexamethylenediamine, N,N,N',N',N''-pentamethyldipropylenetriamine, N,N,N',N'-tetramethyl-1,3-trimethylenediamine, etc. As examples of the polymer having two or more epoxy groups, there are bisphenol-A type diglycidyl ether, resorsin type diglycidyl ether, glycerol triglycidyl ether, novolac type polyglycidyl ether, vinylcyclohexane dioxide, dicyclopentadiene dioxide, etc. As examples of the polymer having two or more halomethyl groups, there are polychloromethylstyrene, chloromethylated polyether ether ketone, etc. The film comprised of any of these crosslinked ion-exchangers should preferably have an ion-exchange capacity of usually 0.3 meq/g to 2.0 meq/g, and particularly 0.5 meq/g to 1.5 meq/g, because those having a large ion-exchange capacity tend to become brittle to make it difficult to be used as the bipolar membrane, and those having a small ion-exchange capacity tend to bring about an increase in electric resistance and also bring about an increase in the water-splitting membrane potential.

The above polymer solution is prepared by dissolving the polymer as described above in an organic solvent exemplified by ethylene chloride, chloroform, tetrahydrofuran, dimethylformamide, N-methylpyrolidone and methylalcohol, with adjustment of its concentration and viscosity to those suited for its coating on the surface of the heavy metal type cation-exchange membrane to form the desired film. As a specific method of film formation, the film can be obtained usually by a method comprising applying the polymer solution to the surface of the heavy metal type cation-exchange membrane by coating or spraying, followed by drying to remove the solvent, or a method comprising immersing in the polymer solution a heavy metal type cation-exchange membrane one side of which has been covered with an opaque film sheet, glass plate or the like, and drawing up the membrane, followed by a similar drying.

In order to increase the peel strength of the bipolar membrane of the present invention and also achieve long-term electrolysis of the bipolar membrane, the surface of the cation-exchange membrane to which the anion-exchange membrane is adhered may preferably be roughened. There are no particular limitations on the method of roughening the surface so long as the performance of the cation-exchange membrane is not impaired. In general, it is preferred to use a means of finely roughening the surface of the cation-exchange membrane by brushing it with sandpaper, fine sands or the like, or roughening the membrane surface by bringing it into contact with a guide roll having a rough surface, used when the membrane is rolled up in the process of manufacturing cation-exchange membranes. The degree of roughness on the surface of the cation-exchange membrane may be on the basis of a depth of usually 0.1 $\mu$ to 100 $\mu$, and preferably 1 $\mu$ to 60 $\mu$.

The bipolar membrane of the present invention enables long-term water splitting to be carried out at a current efficiency of not less than 80%, usually not less than 90%, and at membrane potential of not more than 2.0 V, and usually 0.9 V to 1.8 V. Hence, the power consumption in the water splitting can be greatly decreased. In particular, under circumstances in which products from neutralization between acids and alkalis must not be discarded as environmental pollution sources, it is possible to reclaim acids and alkalis from the salts by electrolysis carried out using the bipolar membrane of the present invention, and thus the present invention can contribute to the birth of a very useful technique.

To describe the present invention in greater detail, the present invention will be described below by giving Examples and Comparative Examples. The present invention is by no means limited to these examples.

In the Examples and Comparative Examples, the characteristics of bipolar membranes were determined by the following measurement: Using platinum plates as electrodes, a given bipolar membrane with an effective area of 10 cm$^2$ was provided between the electrodes. On the side of its cation-exchange membrane, 100 ml of an aqueous solution of 1.00N hydrochloric acid was fed, and on the side of its anion-exchange membrane 100 ml of an aqueous solution on 1.00N sodium hydroxide. At a current density of 10 A/dm$^2$, electric currents were supplied for 4 hours to 16 hours, and thereafter, the quantities of acids, bases and salts in solutions on both sides were measured. Thus, the hydroxyl ion current efficiency $\eta(OH)$, hydrogen ion current efficiency $\eta(H)$, chloride ion current efficiency $\eta(Cl)$ and sodium ion current efficiency $\eta(Na)$ were determined as water-splitting current efficiency of the bipolar membrane. Wire platinum electrodes were also provided cross the bipolar membrane to measure the drop of membrane potential drop of the bipolar membrane.

The peel strength was measured according to JIS K-6854. A tensile shear tester used therefor was TENSILON UTM-1-5000B (manufactured by TOYO BALDWIN CO., LTD.). Using this tester, the strength was measured on test pieces of 25 mm wide bipolar membranes in a wet state, under conditions of a temperature of 23° C., a relative humidity of 52% and a grip movement rate of 200 mm/min.

EXAMPLE 1

A cation-exchange membrane having sulfonic acid groups as ion-exchange groups NEOSEPTA CM-1 (trademark: available from TOKUYAMA SODA CO., LTD.) was previously rubbed with sandpaper to roughened one side surface thereof. Thereafter, the membrane was immersed in an aqueous solution of 2% by weight of ferrous chloride at 25° C. for 1 hour, followed by thorough cleaning with ion-exchanged water and then air drying at room temperature. The cation-exchange membrane thus treated has an iron content of 98% of the total exchange capacity. It was possible to confirm the presence of iron by fluorescent X-ray measurement.

An aminated polysulfone formed by chloromethylation of polysulfone followed by quaternization using trimethylamine (ion-exchange capacity of the quaternary ammonium group: 0.92 meq/g) was dissolved in a mixed solvent of methanol and chloroform (volume ratio: 1:1) to prepare a solution having a concentration of 15% by weight.

Next, on the roughened surface of the above cation-exchange membrane thus treated, the solution of aminated polysulfone was coated, followed by drying to produce a bipolar membrane having a layer of the aminated sulfone with a thickness of 90 μm.

With regard to the bipolar membrane thus obtained, its performances were measured to reveal that it had a peel strength of 5.1 kg·f/25 mm, a water-splitting membrane potential of 1.2 V and current efficiencies of $\eta(H)=99.2\%$, $\eta(OH)=99.2\%$, $\eta(Cl)=0.3\%$ and $\eta(Na)=0.5\%$. These performances of the bipolar membrane did not change even after a lapse of 2 months, and neither bubbles nor blisters were seen to occur in the membrane.

With regard to a bipolar membrane after the lapse of 2 months, its peel strength was measured to reveal that it was 5.2 kg·f/25 mm. With regard to the cation-exchange membrane having been separated, the presence of Fe ions on its adhered surface was measured by fluorescent X-ray measurement. The Fe ions, however, did not remain in such a quantity detectable by the fluorescent X-ray measurement. Now with regard to the same cation-exchange membrane, the presence of Fe ions was measured by ESCA. As a result, it was possible to confirm the presence of Fe ions remaining in the density distribution as shown in FIG. 1. FIG. 1 shows a proportion of Fe atoms and S atoms (Fe/S) measured by ESCA; the former being those remaining in the separated cation-exchange membrane from its surface to its interior in the thickness direction and the latter being those of the sulfonic acid groups: Thus, FIG. 1 shows that the Fe ions are present with a density gradient from the surface (adhered surface) of the cation-exchange membrane toward its opposite surface.

COMPARATIVE EXAMPLE 1

A bipolar membrane was produced by the same procedure as in Example 1 except that the cation-exchange membrane was not treated with the aqueous ferrous chloride solution.

The bipolar membrane thus obtained had performances of a peel strength of 5.3 kg·f/25 mm, a water-splitting membrane potential of 3.2 V and current efficiencies of $\eta(H)=99.3\%$, $\eta(OH)=99.3\%$, $\eta(Cl)=0.3\%$ and $\eta(Na)=0.4\%$. These performances of the bipolar membrane did not change even after a lapse of 2 months, and neither bubbles nor blisters were seen to occur in the membrane.

COMPARATIVE EXAMPLE 2

The same cation-exchange membrane as used in Example 1 was immersed in an aqueous 2% ferrous chloride solution and then taken out. Next, an anion-exchange membrane NEOSEPTA AM-1 (trademark: available from TOKUYAMA SODA CO., LTD.) was superimposed on the above cation-exchange membrane. The membranes thus put together were pressed in a temperature environment of 130° C. under a pressure of 2 kg/cm$^2$ for 10 minutes. The bipolar membrane thus obtained caused blistering at the interface when immersed in water, resulting in separation into two membranes which is of no use.

COMPARATIVE EXAMPLE 3

Comparative Example 2 was repeated except that the cation-exchange membrane as used therein was washed with water to remove the ferrous chloride present on the surface of the cation-exchange membrane, having not been ion-exchanged.

Performances were measured on the resulting bipolar membrane to reveal that it had a peel strength of 0.01 kg·f/25 mm, a water-splitting membrane potential of 1.2 V at the initial stage, which increased to 2.6 V after the lapse of 24 hours, and current efficiencies of $\eta(H)=99.0\%$, $\eta(OH)=99.0\%$, $\eta(Cl)=0.3\%$ and $\eta(Na)=0.7\%$. This bipolar membrane had bubbles at the interface of membrane after the lapse of 16 hours. This bipolar membrane also had such a small peel strength in a wet state that the bubbles that occurred became larger after the lapse of 72 hours, so that it became substantially impossible to continue the experiment of electrolysis.

COMPARATIVE EXAMPLE 4

The same cation-exchange membrane and anion-exchange membrane as used in Comparative Example 2 were dried. These membranes were then bonded to each other using an adhesive comprised of a mixed solution of 1 part of bisphenol-A type diglycidyl ether, 1 part of triethylenetetramine and 1 part of methanol. The membranes thus bonded were pressed, and in that state, left to stand in a temperature environment of 40° C. for 24 hours to give a bipolar membrane. The bipolar membrane thus obtained had a sufficient peel strength, but had a water-splitting membrane potential of as large as 4.3 V.

EXAMPLE 2

Example 1 was repeated except that the surface of the cation-exchange membrane as used therein was not roughened with sandpaper. As a result, the bipolar membrane obtained had performances of a peel strength of 0.28 kg·f/25 mm, a water-splitting membrane potential of 1.2 V and current efficiencies of $\eta(H)=99.2\%$, $\eta(OH)=99.2\%$, $\eta(Cl)=0.3\%$ and $\eta(Na)=0.5\%$. These performances of the bipolar membrane showed a little increase in membrane potential to 1.4 V after the lapse of 2 months, but neither bubbles nor blisters were seen to occur in the membrane.

EXAMPLE 3

Polydimethylvinylbenzylamine (molecular weight: about 10,000) was dissolved in chloroform. Subsequently bisphenol-A diglycidyl ether was dissolved therein. Thus, a solution comprising polydimethylvinylbenzylamine, bisphenol-A diglycidyl ether and chloroform in 1:1:10 (weight ratio) was prepared. This solution was coated on a cation-exchange membrane containing Fe, having been treated in the same manner as in Example 1, followed by drying at room temperature for 10 hours to effect curing of the epoxy resin. At the same time, an anion-exchange membrane of a quaternary ammonium group type was formed. A bipolar membrane was thus produced.

The bipolar membrane thus obtained had performances of a peel strength of 5.0 kg·f/25 mm, a water-splitting membrane potential of 1.3 V and current efficiencies of $\eta(H)=99.4\%$, $\eta(OH)=99.4\%$, $\eta(Cl)=0.3\%$ and $\eta(Na)=0.3\%$. These performances did not change even after the lapse of 3 months, and no bubbles or the like were seen to occur in the membrane.

EXAMPLE 4

The same cation-exchange membrane (NEOSEPTA CM-1) as used in Example 1, with its surface having been roughened, was immersed in an aqueous tin chloride ($SnCl_2$) solution of 1% by weight, and thereafter thoroughly washed with ion-exchanged water, followed by air drying at room temperature. The cation-exchange membrane thus treated had a tin content of 3.2% of the total exchange capacity.

An aminated polyphenylene oxide with an ion-exchange capacity of 1.02 meq/g, formed by chloromethylation of polyphenylene oxide followed by quaternization using trimethylamine, was dissolved in a mixed solvent of methanol and chloroform (volume ratio: 1:1) to prepare a solution with a concentration of 15% by weight.

Next, on the above cation-exchange membrane, the solution of aminated polyphenylene oxide was coated, followed by drying to form an anion-exchange membrane with a thickness of 95 μm. A bipolar membrane was thus produced.

The bipolar membrane thus obtained had performances of a peel strength of 4.3 kg·f/25 mm, a water-splitting membrane potential of 1.3 V and current efficiencies of $\eta(H)=99.3\%$, $\eta(OH)=99.3\%$, $\eta(Cl)=0.3\%$ and $\eta(Na)=0.4\%$. These performances did not change even after the lapse of 2 months, and neither bubbles nor blisters were seen to occur in the membrane.

EXAMPLE 5

The same cation-exchange membrane (NEOSEPTA CM-1) as used in Example 1, with its surface having been roughened, was immersed in an aqueous ruthenium chloride ($RuCl_3$) solution of 0.1% by weight at 25° C. for a day, and thereafter thoroughly washed with ion-exchanged water, followed by air drying at room temperature. This cation-exchange membrane had a ruthenium content of 0.02% of the total exchange capacity.

An aminated polystyrene formed by quaternization of chloromethyl groups of a styrene-chloromethylstyrene copolymer (molar ratio of monomers: 10:1) using trimethylamine was dissolved in a mixed solvent of methanol and chloroform (Volume ratio: 1:5) to prepare a solution with a concentration of 15% by weight.

Next, on the above cation-exchange membrane, the solution of aminated polystyrene was coated, followed by drying to form an anion-exchange membrane with a thickness of 85 μm. A bipolar membrane was thus produced.

The bipolar membrane thus obtained had performances of a peel strength of 4.7 kg·f/25 mm, a water-splitting membrane potential of 1.2 V and current efficiencies of $\eta(H)=99.2\%$ $\eta(OH)=99.2\%$, $\eta(Cl)=0.3\%$ and $\eta(Na)=0.5\%$. These performances did not change even after a lapse of 6 months, and neither bubbles nor blisters were seen to occur in the membrane.

EXAMPLE 6

Example 1 was repeated except that the aqueous solution used therein for ion exchange to the cation-exchange membrane was replaced with each of the aqueous solutions of the compounds shown in Table 1. As a result, the bipolar membranes obtained had the performances shown in Table 1. In all the bipolar membranes, neither bubbles nor blisters were seen to occur in the membrane.

TABLE 1

| Run No. | Compound (Temp. of solution used) | Peel Strength (kg·f/25 mm) | Membrane Potential (V) | Current Efficiency (%) | |
|---|---|---|---|---|---|
| | | | | $\eta$ (H) | $\eta$ (OH) |
| 1 | $FeCl_3$ (2%) | 5.1 | 1.4 | 99.2 | 99.2 |
| 2 | $TiCl_4$ (2%) | 5.3 | 1.6 | 99.2 | 99.2 |
| 3 | $ZrCl_4$ (2%) | 5.5 | 1.7 | 99.2 | 99.2 |
| 4 | $PdCl_2$ (2%) | 4.8 | 1.5 | 99.2 | 99.2 |

EXAMPLE 7

On one side of the cation-exchange membrane obtained in Example 5, containing ruthenium ions, a 15% by weight solution prepared by dissolving chlorine in a content of 1.5 meq/g was coated, and thereafter, the solvent was evaporated at room temperature, followed by drying to give a film with a thickness 90 μm.

Next, the above cation-exchange membrane was immersed in an aqueous solution of 3% by weight of N,N-dimethylpropanediamine at 25° C. for 10 days to effect quaternary amination of chloromethyl groups and crosslinking. A bipolar membrane was thus obtained. The aminated polystyrene film had a thickness of 100 um.

The performances of the bipolar membrane thus obtained were measured to reveal that it had a peel strength of 2.1 kg·f/25 mm, a water-splitting membrane potential of 1.4 V and current efficiencies of $\eta(H)=99.0\%$, $\eta(OH)=99.0\%$, $\eta(Cl)=0.3\%$ and $\eta(Na)=0.8\%$. These performances did not change even after the lapse of 3 months. During this period, neither bubbles nor blisters were seen at all to occur in the bipolar membrane.

We claim:

1. A bipolar membrane comprising a cation-exchange membrane in which a cation-exchange group present at least at its adhered surface has been ion-exchanged with a heavy metal ion; and an anion-exchange membrane formed on said ion-exchanged cation-exchange membrane from a solution of a polymer having an ion-exchange group or a functional group which introduces an anion-exchange group which as been applied to the surface of the ion-exchanged cation-exchange membrane;
    said cation-exchange membrane and said anion-exchange membrane being adhered closely to each other at a peel strength of not less than 0.2 kg·f/25 mm;
    said bipolar membrane having a water-splitting current efficiency of not less than 80%, and a water-splitting membrane potential of not more than 2.0 V; and
    wherein when said bipolar membrane is used for electrolysis neither blisters nor bubbles occur at the interface between said cation-exchange membrane and said anion exchange membrane during electrolysis.

2. A bipolar membrane according to claim 1, wherein no free heavy metal salt compound is present at the interface between said cation-exchange membrane and said anion-exchange membrane.

3. A bipolar membrane according to claim 1, wherein said anion-exchange membrane has a thickness of 5 μm to 300 μm.

4. A bipolar membrane according to claim 1, wherein said heavy metal ion is an ion of anyone selected from titanium, iron, zirconium, ruthenium, palladium and tin.

5. The bipolar membrane according to claim 4 wherein the heavy metal ion is present in an amount ranging from about 0.001% to 100% of the total ion-exchange capacity.

6. The bipolar membrane according to claim 4 wherein the heavy metal ion is present in an amount ranging from about 0.01% to 50% of the total ion-exchange capacity.

7. A bipolar membrane according to claim 1, wherein an anion-exchange capacity at the part of said anion-exchange membrane ranges from 0.4 meq/g to 2.5 meq/g and a cation-exchange capacity at the part of said cation-exchange membrane ranges from 0.5 meq/g to 3 meq/g.

8. A bipolar membrane according to claim 1, wherein the surface of said cation-exchange membrane is roughened.

9. The bipolar membrane according to claim 1 wherein the anion-exchange group is soluble.

10. The bipolar membrane according to claim 1 wherein the anion-exchange capacity of the membrane ranges from 0.6 meg/g to 1.5 meg/g.

11. The bipolar membrane according to claim 1 wherein the anion-exchange membrane is a polymer having an anion-exchange group.

12. The bipolar membrane according to claim 11 wherein the polymer having an anion-exchange group is a polymer having a chloromethyl group.

13. The bipolar membrane according to claim 12 wherein the combination of polymers is selected from the group consisting of a combination of a polymer having at least two tertiary amino groups with a polymer having at least two epoxy groups and a combination of a polymer having at least two tertiary amino groups and a polymer having at least two halomethyl groups.

14. The bipolar membrane according to claim 11 wherein the polymer having an anion-exchange group comprises a combination of a polymer having an anion-exchange group or a functional group which introduces an anion-exchange group, a polymer having at least two reactive groups and optionally an anion-exchanger having a crosslinked structure.

15. The bipolar membrane according to claim 14 wherein the membrane comprises said anion-exchanger having a cross-linked structure and an ion-exchange capacity ranging from about 0.3 meq/g to 2.0 meq/g.

16. A bipolar membrane comprising a film of a polymer having an anion-exchange group, as an anion-exchange membrane, formed on the surface of a cation-exchange membrane in which the cation-exchange groups have been ion-exchanged with heavy metal ions, whereby the heavy metal ion-exchanged cation exchange membrane and the anion-exchange membrane adhere to each other with a peel strength of not less than 2 kg·f/25 mm, and wherein when said bipolar membrane is used for electrolysis of water formation of blisters and bubbles at the interface between the cation-exchange membrane and anion-exchange membrane is inhibited, said bipolar membrane having a water-splitting current efficiency of not less than 80%, and a water-splitting membrane potential of not more than 2.0 V.

17. The bipolar membrane of claim 16 wherein the water-splitting current efficiency is not less than 90% and the water-splitting membrane potential is not more than 1.8 V.

18. The bipolar membrane of claim 1 having a water-splitting current efficiency of not less than 90%.

* * * * *